United States Patent [19]

Pennekamp

[11] 4,138,388

[45] Feb. 6, 1979

[54] METHOD FOR PRODUCING A MOLDING COMPOUND

[75] Inventor: Günther Pennekamp, Vreden, Fed. Rep. of Germany

[73] Assignee: Firma Pennekamp & Huesker KG, Vreden, Fed. Rep. of Germany

[21] Appl. No.: 899,737

[22] Filed: Apr. 25, 1978

[30] Foreign Application Priority Data

Oct. 8, 1977 [DE] Fed. Rep. of Germany ....... 2745339

[51] Int. Cl.$^2$ ............................................... C08K 7/20
[52] U.S. Cl. .................................................. 260/42.46
[58] Field of Search ...................................... 260/42.46

[56] References Cited

U.S. PATENT DOCUMENTS

| 3,078,250 | 2/1963 | Thompson | 260/42.46 |
| 3,997,494 | 12/1976 | Lever et al. | 260/42.46 |

FOREIGN PATENT DOCUMENTS 2435220  2/1975  Fed. Rep. of Germany ........ 260/42.46

*Primary Examiner*—Lewis T. Jacobs
*Attorney, Agent, or Firm*—Charles E. Baxley

[57] ABSTRACT

A method for producing a molding compound for the manufacture of highly wear resistant parts first mixes high-molecular low-pressure polyethylene particles with particles of a cadmium salt and titanium dioxide. The mixture is rapidly raised in a high speed mixer to a temperature of between 105° C and 108° C at which point glass micro-beads having diameters of the order of 50 micrometers are added. This mixture is then fed into a sintering press in the form of a web of plate thickness wherein it is compressed in stepwise increments to a pressure of 100 kgf/cm$^2$ and heated to about 180° C. This is followed by a cooling step which depends on the desired crosslinking of the molecular chains.

11 Claims, No Drawings

METHOD FOR PRODUCING A MOLDING COMPOUND

BACKGROUND OF THE INVENTION

The present invention relates to a method for producing a molding compound for the manufacture of plastic parts with high resistance to wear, particularly for wear members of conveyor systems and machines, such as pulp-drainage parts in paper machines, in which high molecular low-pressure polyethylene is mixed with a cadmium salt and titanium dioxide and hot-compressed.

In one known method of this type (German Pat. No. 19 25 408), the high-molecular low-pressure polyethylene is mixed in the form of a screened granulate with additives and compressed to form a molding. This is done in a fusion-compression process under relatively low pressure. After cooling, this molding is ground and mixed with 10 to 40% of pure low-pressure polyethylene granulate. This mixture which consists in part of a reclaimed material and in part of pure starting plastic is then again hot-pressed.

After the plasticizing and cooling, there is obtained a semi-finished plastic product which is not only hard and thus resistant to rubbing or frictional wear but is also hydrophilic, so that, upon the action of water, a permanent film of water can remain on the surface of this plastic product. The hydrophilic properties are obtained by the admixed cadmium salt while the hardness is obtained by the admixed titanium dioxide. Such semi-finished plastic products are particularly well-suited for the manufacture of highly stressed plastic parts of machine-wire tables for paper machines over which the water-entraining wires are moved at high speed. Although, in particular, the addition of the cadmium salts considerably improves the sliding properties of such plastic parts of high-molecular low-pressure polyethylene, these parts are still subject to a very large amount of wear.

It is known, it is true, that the wear of such plastic parts can be decreased further by embedding microbeads in the plastic material. In one known method of this type for the manufacture of polyethylene semi-finished products (French Patent 23 19 662), the starting material, namely the high-molecular polyethylene, in an amount of 79.3% by weight, has added to it a proportion of 16.7% by weight of antistatic acetylene black. The addition of acetylene is intended to improve the sliding properties while at the same time the hardness of the glass micro-beads is to increase the resistance of the plastic parts to wear. For this reason also the proportion of glass micro-beads, namely 16.7% by weight, is relatively high. The practical results show, however, that with a low-pressure polyethylene prepared in this manner it is not possible for several reasons to obtain the desired wear properties.

On the one hand, a statistically uniform distribution of the glass micro-beads in the plastic is not obtained so that regions of different density of the embedded glass micro-beads are present in the plastic and accordingly result in different wear properties of these regions. Both, because of this and due to the low cross-linking of the polymer molecule chains the glass micro-beads loosen from the plastic when the plastic parts in question are subjected to wear. Furthermore, as a result of the glass beads which protrude from partially eroded plastic, the parts which slide over the plastic guide, such as for instance the screen wires of paper machines, are subjected to excessively great stress.

SUMMARY OF THE INVENTION

An object of the present invention, therefore, is to provide a method for the production of a semi-finished plastic product in which there is a harmonious proportion between the resistance of embedded glass micro-beads and its hardness as well as the sliding properties of the supporting plastic in which the glass micro-beads are anchored firmly in the cross-linking of the plastic molecules so that a statistically uniform distribution of the microglass beads is substantially assured.

This and other objects are obtained by a method of the above indicated type by first of all mixing the low-pressure polyethylene in the form of a fine granulate or powder with a cadmium salt and titanium dioxide and then rapidly heating the mixture to a temperature of which plasticizing commences on the surface of the individual plastic particles. Then the glass micro-beads are added and the mixture is further heated under pressure to the plasticizing temperature. Finally the plasticized mixture is cooled.

A particular advantage of the method of the invention resides in the fact that, as a result of the preheating of the plastic granulate or powder up to incipient plasticizing of the plastic particles on their surface, a very good inclusion of the subsequently added glass micro-beads is achieved.

Another very important advantage in this connection is that the glass micro-beads cannot settle out in the mixer due to the tackiness of the plastic particles, so that the plastic granulate or powder could then float on top of the glass micro-beads of much greater density; this also favors a uniform distribution of the glass micro-beads in the plastic granulate or powder. In accordance with the invention one obtains a powder mixture without needing to add foreign additions known for this purpose such as dispersing agents.

It should be noted that despite the interruption of the self-contained structure by the glass micro-beads the plastic is completely homogenous. As a result, corrosive media such as, for instance, acids and alkalis, cannot find any point of attack for embedment in and destroying the surface of the material. In contradistinction to the acetylene of the known use, which can improve only the hydrophilic properties of the plastic, the additives employed, namely a salt of cadmium such as cadmium sulfide and titanium dioxide, also bring about a further stabilizing of the overall structure of the plastic and a reduction in the coefficient of friction of the surface of the material. As a result, the reinforcing effect of the micro-glass beads is advantageously combined with the properties of the high-molecular low-pressure polyethylene caused by the other additives.

DESCRIPTION OF THE PREFERRED EMBODIMENT

Broadly, the invention contemplates the method of making plastic molding compound by mixing low-pressure polyethylene (plastic) in the form of a fine granulate or powder with a cadmium salt and preferrably cadmium sulfide and titanium dioxide (additives) and then rapidly heating the mixture to the temperature at which plasticizing begins on the surface of the polyethylene particles. At that instant glass micro-beads are added and the mixture is further heated under pressure to the plasticizing temperature. Then the mixture is cooled.

The rapid heating of the plastic powder is preferred so that the temperature gradient on the individual plastic particles, which can be considered approximately as spheres, is directed as far as possible radially inward. The individual plastic particles should, namely, soften merely on their surface and therefore remain slightly tacky—and accordingly should not soften beyond a given depth of penetration before the addition of the glass micro-beads; they should so to speak be surface-plasticized. In this connection, only a very slight, if any, coagulation of the plastic particles are introduced into the plastic powder which has been heated in this manner, the glass micro-beads adhere to the surface of the plastic particles, such surface being able to receive only a given number of glass micro-beads per unit of area, corresponding to the adhesive force present. Since it can be assumed that the particle size of the plastic powder is constant, a uniform covering of the individual plastic particles with glass micro-beads on their surface takes place. If the quantity proportions between plastic powder and glass micro-beads are carefully established there is obtained a substantially statistically uniform distribution of the glass micro-beads within the plastic powder.

In order for it not to be necessary to heat the plastic powder in a separate heating process before the glass micro-beads are introduced it is preferred to heat the powder in a high-speed mixer by means of frictional heat. On the one hand, this takes place very rapidly while, on the other hand, a further increase in temperature can be immediately prevented by reducing the speed of rotation of the mixer as soon as the desired plasticizing temperature has been reached on the plastic particles. The addition of the glass micro-beads can then be effected without delay directly into the high-speed mixer.

An improvement in the final product (plastic molding compound) is obtained when a particularly firm embedding of the glass micro-beads in the plastic is achieved by a double hot-pressing of the mixture of plastic, additives and glass micro-beads with an intervening cooling phase.

Another improvement in the properties of the resulting plastic molding compound can also be obtained by the addition of barium sulfate and phthalocyamine as further additives to the polyethylene granulate. In this way, the coloring of the semi-finished plastic article can also be influenced without impairing the desired properties with respect to resistance to wear.

For a substantially statically uniform distribution of the glass micro-beads in the powdered mixture a diameter of the glass micro-beads of 50 micrometers or less has proven satisfactory. Furthermore, this order of magnitude of the diameter of the glass micro-beads is advantageous for the double-cross linking of the high molecular low-pressure polyethylene in connection with hot pressing processes.

A mixture proportion of 93.33 weight % low pressure polyethylene, 1.91 weight % additives and 4.76 weight % glass micro-beads is further more advantageous in order still to assure a sufficient amount of plastic in the surface of the plastic molding compound in case of a statistically uniform distribution of the glass micro-beads so that the wear-increasing glass beads are not too prominent with respect to the fluid conducted over the finished plastic parts. When one uses semi-finished plastic material made in accordance with the invention in the manufacture of the wear parts of wire-screen tables of paper machines the paper draining wires of these tables are assured gentle treatment.

The addition substances or additives, either merely cadmium sulfide and titanium dioxide or cadmium sulfide, titanium dioxide, barium sulfate and phthalocyanine, are advisedly added in equal proportions so that they each constitute one half or one quarter respectively of the 1.91 weight % of the total addition substances.

Finally, while the plasticizing temperature in the two hot pressing processes is dependent not only on the specific pressing method used but also, for instance, on the intensity of flow of the starting material which is to be compressed and therefore always requires special adaptation, in general the intermediate cooling can be established by lowering the temperature to about 80° C. In this connection the intermediate cooling may suitably also be effected under pressure, in the same way as the preceding hot pressing process. A constant pressure is preferably provided for the first heating of the mixture, the intermediate cooling, and the second heating.

The invention will now be explained with reference to a specific preferred embodiment.

A batch is formed in a high speed mixer consisting of 93.3 weight % low-pressure polyethylene powder or granulate, 1.91 weight % powdered additives and 4.76 weight % glass micro-beads. The 1.91% by weight of additives consists of equal parts of cadmium sulfide, titanium dioxide, barium sulfate, and phthalocamine.

First of all, only the polyethylene powder and the additives are filled into a high-speed mixer. The speed of rotation of the high-speed mixer is adjusted in such a manner that plasticizing commences on the surface of the individual plastic particles within a short time, for instance 2½ minutes, as a result of the frictional heat introduced into the powder.

The required surface temperature of the individual plastic particles is about 120° C. in the case of high-molecular low-pressure polyethylene. This temperature may also be even somewhat higher for a short time as long as complete heating throughout of the individual plastic particles does not as yet occur and thus a continuous removal of heat from the surface of the plastic particles towards the inside takes place. This temperature must be determined empirically on basis of the type of plastic; in the case of high-molecular low-pressure polyethylene it is between 105° C. and 118° C.

Only after this temperature has been reached are the glass micro-beads introduced into the plastic powder which is either still uncoagulated or only very slightly coagulated. In this process the speed of rotation of the high-speed mixer is decreased in order to avoid addition of heat. As a result of the adhesive action of the plastic particles which have been plasticized on their surface, the glass micro-beads place themselves uniformly on the entire incipiently plasticized surface of all the plastic particles. In this way the plastic particles are dried off with respect to each other so that even in the event that coagulation has already taken place the individual plastic particles can be separated again. This is due to the mechanical action of the glass micro-beads on the individual plastic particles in the manner that the glass micro-beads, as a result of the continuous revolving of the entire mixture are agglomerated on the surface of the plastic particles. In this connection, it is still possible, via a temperature difference between the glass microbeads which are generally introduced at room temperature into the high speed mixer and the heated plastic powder to prevent overheating and complete softening of the plastic particles or even to effect a cooling of such particles. As a whole, these measures assure that the glass micro-beads will be distributed as homogeneously as possible in the plastic so that the plastic will not float on top of the glass beads because of its lower density.

The particles size of the glass micro-beads is naturally dependent on their diameter. The diameter of the glass micro-beads is advantageously about 50 micrometers, so that the glass micro-beads as a whole also have the character of a powder The powder mixture of plastic powder, additives and glass powder is then charged into a sintering press in the form of a web of plate thickness. It is compressed therein step-wise up to a pressure of 100 kgf/cm$^2$. Thereupon the compressed web is heated above the plasticizing temperature of the plastic to about 180° C. This temperature depends in detail essentially also on the thickness of plate selected. The heating of the compressed web advisedly takes place from the center towards the outside in order to allow the plasticizing to take place from the inside towards the outside. There is preferably used a high-molecular low-pressure polyethylene whose plasticizing temperature is just about 140° C.

Depending on the desired cross linking of the plastic molecular chains the plasticized mass can now be cooled to room temperature. A so-called intermediate cooling to about 80° C. under a pressure of 100 kgf/cm$^2$ is advantageous after the first hot pressing whereupon the product is again heated to plasticizing temperature, the pressure of 100 kgf/cm$^2$ either being retained or, after prior reduction of pressure, the individual pressure stages being again passed through. After cooling to 30° C., the semi-finished plastic products then present in the form of plates can be removed from the molds.

I claim:

1. In the method for producing a molding compound for the manufacture of plastic parts of high resistance to wear, in which high-molecular low-pressure polyethylene is mixed with cadmium salt and titanium dioxide as additives and then hot-pressed the improvement comprising mixing particles of low-pressure polyethylene and additives comprising particles of a cadmium salt and titanium dioxide, then rapidly heating the mixture to a temperature at which plasticizing commences on the surface of the individual polyethylene particles, at that time adding glass micro-beads to the mixture, then heating the mixture under pressure to the plasticizing temperature and thereafter cooling the mixture.

2. The method according to claim 1, wherein the mixture of low-pressure polyethylene particles at the particles of the cadmium salt and titanium dioxide are loaded in a high-speed mixer so that frictional heat raises the temperature of the polyethylene particles to that at which the surface plasticizing commences.

3. The method according to claim 2, wherein the temperature to which the high speed mixer raises the low-pressure polyethylene particles is 105° C. to 118° C.

4. The method according to claim 2 further comprising the step, after said heating to the plasticizing temperature and cooling, of again heating the mixture to the plasticizing temperature and thereafter again cooling the mixture.

5. The method according to claim 1 wherein said cadmium salt is cadmium sulfide and further adding barium sulfate and phthalocyanine to the mixture of low-pressure polyethylene particles, cadmium sulfide, titanium dioxide, and glass micro-beads.

6. The method according to claim 1 wherein the diameter of the glass micro-beads is no greater than 50 micrometers.

7. The method to claim 1 wherein the mixture ratio is 93.33 weight % low-pressure polyethylene particles, 1.91 weight % additives and 4.76 weight % glass micro-beads.

8. The method according to claim 7, wherein the additives are added in equal amounts.

9. The method according to claim 4 wherein the first cooling step is effected to a temperature of about 80° C.

10. The method according to claim 9, the first cooling step is effected under pressure.

11. The method according to claim 10, wherein the heating step after the addition of the glass micro-beads the first cooling step and the last heating step are carried out under constant pressure.

* * * * *